United States Patent
Zhu et al.

(10) Patent No.: US 9,553,705 B2
(45) Date of Patent: Jan. 24, 2017

(54) METHOD AND APPARATUS FOR ALLOCATING FEEDBACK TRANSMISSION RESOURCE AND METHOD AND APPARATUS FOR PROVIDING INFORMATION ON VALUES THEREOF

(75) Inventors: Dalin Zhu, Beijing (CN); Ming Lei, Beijing (CN); Lingyang Song, Beijing (CN); Zhongshan Zhang, Beijing (CN); Tianyu Wang, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 164 days.

(21) Appl. No.: 13/995,818

(22) PCT Filed: Nov. 8, 2011

(86) PCT No.: PCT/CN2011/081955
§ 371 (c)(1),
(2), (4) Date: Jul. 11, 2014

(87) PCT Pub. No.: WO2013/067690
PCT Pub. Date: May 16, 2013

(65) Prior Publication Data
US 2014/0328218 A1    Nov. 6, 2014

(51) Int. Cl.
*H04L 12/16*   (2006.01)
*H04W 4/00*    (2009.01)
(Continued)

(52) U.S. Cl.
CPC ............. *H04L 5/0053* (2013.01); *G06Q 30/08* (2013.01); *H04L 5/0073* (2013.01); *H04L 5/14* (2013.01);
(Continued)

(58) Field of Classification Search
CPC ........ H04L 5/0053; H04L 5/14; H04L 5/0073; G06Q 30/08; H04W 72/1231; H04W 72/1257
See application file for complete search history.

(56) References Cited

U.S. PATENT DOCUMENTS 7,177,832 B1 *  2/2007  Semret ................... G06Q 30/02
                                                        705/1.1
2007/0263583 A1 * 11/2007  Hyon ..................... H04W 72/04
                                                        370/338
(Continued)

FOREIGN PATENT DOCUMENTS

CN       101156464 A    4/2008
CN       101686113 A    3/2010
JP       2002-540510 A  11/2002

OTHER PUBLICATIONS

Communication dated Oct. 28, 2015 from the State Intellectual Property Office of the P.R.C. in counterpart application No. 201180062622.1.

*Primary Examiner* — Kiet Tang
(74) *Attorney, Agent, or Firm* — Sughrue Mion, PLLC (57) ABSTRACT

The present invention provides a method and apparatus for allocating feedback transmission resource and a method and apparatus for providing information on values thereof. According to the method of allocating feedback transmission resource, the feedback transmission resource is divided into a plurality of resource units, and the method can comprise receiving information on values of the plurality of resource units for the mobile stations; determining values of possible resource allocation status in each bidding round for the mobile stations from the received information on the values based on the sequential second price auction; and deriving an auction process of the resource units from the determined values of possible resource allocation status in each bidding round based on the sequential second price auction, so as to obtain a final resource unit allocation result for the mobile stations. With embodiments of the present invention, it is possible to improve performance in sum channel capacity and at the same time it can achieve preservation in fairness among MSs. In preferred embodi-
(Continued)

ments of the present invention, the feedback transmission resource can be optimized between at least two kinds of feedback information such as channel station information and intercell interference information, which will further improve the system performance.

26 Claims, 6 Drawing Sheets

(51) Int. Cl.
    *G06Q 10/00*      (2012.01)
    *H04L 5/00*      (2006.01)
    *G06Q 30/08*      (2012.01)
    *H04L 5/14*      (2006.01)
    *H04W 72/12*      (2009.01)

(52) U.S. Cl.
    CPC ..... *H04W 72/1231* (2013.01); *H04W 72/1257* (2013.01)

(56) References Cited

U.S. PATENT DOCUMENTS

| | | | |
|---|---|---|---|
| 2009/0034465 A1* | 2/2009 | Papasakellariou | H04L 5/0037 370/329 |
| 2009/0232074 A1 | 9/2009 | Yang et al. | |
| 2013/0044707 A1* | 2/2013 | Chen | H04W 72/1231 370/329 |

\* cited by examiner

METHOD AND APPARATUS FOR ALLOCATING FEEDBACK TRANSMISSION RESOURCE AND METHOD AND APPARATUS FOR PROVIDING INFORMATION ON VALUES THEREOF

FIELD OF THE INVENTION

Embodiments of the present invention generally relate to the field of a wireless network technology, and more particularly, relate to a method and apparatus for allocating feedback transmission resource for mobile stations based on the sequential second price auction and a method and apparatus for providing information on values of the feedback transmission resource for a mobile station.

BACKGROUND OF THE INVENTION

It has been well recognized that the capacity of a wireless system is usually limited because of intracell interference and intercell interference (ICI). To tackle with this problem, there has been proposed many technologies in the prior art. One of possible solutions is to send channel state information (CSI) to the transmitter side through a feedback channel, and with the knowledge of CSI about nearby co-channel mobile stations (MSs), it is possible to actively suppress the signal to the interfered users and maximize the effective signal power. In this case, the base station (BS) can obtain the required channel coefficients through a feedback channel from the MSs and then employ mechanisms such as multiple-antenna pre-coding to mitigate the effects of the interferences and to exploit spatial dimensions to increase the capacity of the wireless network.

However, the feedback channel has a limited capacity and thus it is important to investigate how to control the amount of the feedback overhead according to the individual requirements so as to improve quality of service (Qos) and preserve fairness among the MSs.

Additionally, in the existing wireless network, it typically treated each MS independently and researched the multi-MS CSI problem in physical layer for example from the point of view of either communication or information theory. This means that interactions among the MSs are not taken into account, whereas intercell interference (ICI) is also an important factor influencing the system performance. However, there is no any existing technique that has considered both CSI and ICI.

Therefore, there is a need for a new feedback rate control solution in the art.

SUMMARY OF THE INVENTION

In view of the foregoing, the present invention provides a new feedback rate control solution for mobile stations based a sequential second price auction so as to solve or at least partially mitigate at least a part of problems in the prior art.

According to an aspect of the present invention, there is provided a method of allocating feedback transmission resource for mobile stations based on a sequential second price auction, wherein the feedback transmission resource is divided into a plurality of resource units. The method can comprise: receiving information on values of the plurality of resource units for the mobile stations; determining values of possible resource allocation status in each bidding round for the mobile stations from the received information on the values based on the sequential second price auction; and deriving an auction process of the resource units from the determined values of possible resource allocation status in each bidding round based on the sequential second price auction, so as to obtain a final resource unit allocation result for the mobile stations.

In an embodiment of the present invention, the values of the plurality of resource units for the mobile stations can be channel capacity gains with respective resource units being obtained by respective mobile stations.

In another embodiment of the present invention, the values of the plurality of resource units for the mobile stations can be determined under the condition that the feedback transmission resource is optimized among at least two kinds of different feedback information.

In a further embodiment of the present invention, determining the values of possible resource allocation status in each bidding round for the mobile stations can comprise: determining the values of possible resource allocation status in a final bidding round for the mobile stations from the received information on the values; and determining the values of possible resource allocation status in other bidding rounds for the mobile stations from the determined values of possible resource allocation status in the final bidding round based on the sequential second price auction.

In a yet further embodiment of the present invention, determining the values of possible resource allocation status in the final bidding round for the mobile stations from the received information on the values comprises: determining the values for respective mobile stations with the number of resource units as indicated by the possible resource allocation status being obtained by the respective mobile stations.

In a still further embodiment of the present invention, determining the values of possible resource allocation status in other bidding rounds for the mobile stations can comprise: for a bidding round, determining bids of the mobile stations in the next bidding round from values of possible resource allocation status in the next bidding round; determining the mobile station who will win in the next bidding round from bids of the mobile stations and the resulting resource allocation status if the mobile station wins; determining the value of the possible resource allocation status in the bidding round for the mobile station who will win as the value of the resulting resource allocation status for the mobile station minus the second maximum bid of the bids of the mobile stations; and determining the values of the possible resource allocation status in the bidding round for the mobile stations who will lose as the values of the resulting resource allocation status for these mobile stations.

In a still yet further embodiment of the present invention, deriving an auction process of the resource units from the determined values of possible resource allocation status in each bidding round based on the sequential second price auction comprises: determining resulting resource allocation status in each bidding round from the determined values of possible resource allocation status based on the sequential second price auction; and determining a resulting resource allocation status in a final bidding round as the final resource unit allocation result for the mobile stations.

In another embodiment of the present invention, the at least two kinds of different feedback information comprises channel state information and intercell interference information.

In a further embodiment of the present invention, the feedback transmission resource comprises any of feedback rate and feedback bandwidth, and the plurality of resource units have a same size.

According to another aspect of the present invention, there is also provided an apparatus of providing information on values of feedback transmission resource for a mobile station, wherein the feedback transmission resource is divided into a plurality of resource units. The method can comprise: determining the value of each resource unit of the plurality of resource units for the mobile station from a channel capacity gain with the each resource unit being obtained; transmitting information on the value of each resource unit of the plurality of resource units for use in allocating the feedback transmission resource by a base station.

In an embodiment of the present invention, the values of each resource unit of the plurality of resource units for the mobile station can be determined under the condition that the feedback transmission resource is optimized among at least two kinds of different feedback information.

In another embodiment of the present invention, the at least two kinds of different feedback information can comprise channel state information and intercell interference information.

In a further embodiment of the present invention, the feedback transmission resource can comprise any of feedback rate and feedback bandwidth, and the plurality of resource units have a same size.

According to a further aspect of the present invention, there is provided an apparatus for allocating feedback transmission resource for mobile stations based on a sequential second price auction, wherein the feedback transmission resource is divided into a plurality of resource units. The apparatus can comprise: information receiving unit for receiving information on values of the plurality of resource units for the mobile stations; value determination unit for determining values of possible resource allocation status in each bidding round for the mobile stations from the received information on the values based on the sequential second price auction; and process derivation unit for deriving an auction process of the resource units from the determined values of possible resource allocation status in each bidding round based on the sequential second price auction, so as to obtain a final resource unit allocation result for the mobile stations.

According to a still further aspect of the present invention, there is provided an apparatus for providing information on values of feedback transmission resource for a mobile station, wherein the feedback transmission resource is divided into a plurality of resource units. The apparatus can comprise resource value determination unit for determining the value of each resource unit of the plurality of resource units for the mobile station from a channel capacity gains with the each resource unit being obtained; resource value transmission unit for transmitting information on the value of each resource unit of the plurality of resource units for use in allocating the feedback transmission resource by a base station.

With embodiments of the present invention, it is possible to improve performance in sum channel capacity and at the same time it can achieve the fairness among the MSs. In preferred embodiments of the present invention, the feedback transmission resource can be optimized between at least two kinds of feedback information such as channel station information and intercell interference information, which will further improve the system performance.

BRIEF DESCRIPTION OF THE DRAWINGS

The above and other features of the present invention will become more apparent through detailed explanation on the embodiments as illustrated in the embodiments with reference to the accompanying drawings throughout which like reference numbers represent same or similar components and wherein.

DETAILED DESCRIPTION OF EMBODIMENTS

Hereinafter, a method and apparatus for allocating feedback transmission resource for the mobile stations based on a sequential second price auction and a method and apparatus for providing information on values of feedback transmission resource for a mobile station as provided in the present invention will be described in detail through embodiments with reference to the accompanying drawings. It should be appreciated that these embodiments are presented only to enable those skilled in the art to better understand and implement the present invention, not intend to limit the scope of the present invention in any manner.

It should be first noted that this invention is illustrated in particular sequences for performing the steps of the methods. However, these methods are not necessarily performed strictly according to the illustrated sequences, and they can be performed in reverse sequence or simultaneously based on natures of respective method steps. Beside, the indefinite article "a/an" as used herein does not exclude a plurality of such steps, units, devices, and objects, and etc.

Additionally, in the present invention, $[.]^T$ denotes transpose of a vector or matrix; $[.]^H$ denotes a conjugate transpose of a vector or matrix; $[.]^*$ denotes a conjugate of a vector or matrix, $X \sim N(m, \sigma^2)$ denotes a complex Gaussian random variable with mean m and variance $\sigma^2$; $[A]_{mn}$ denotes the m-th element of matrix A; $\|x\|^H$ denotes $x^H x$; and var[x] represents variance.

Figure 1:
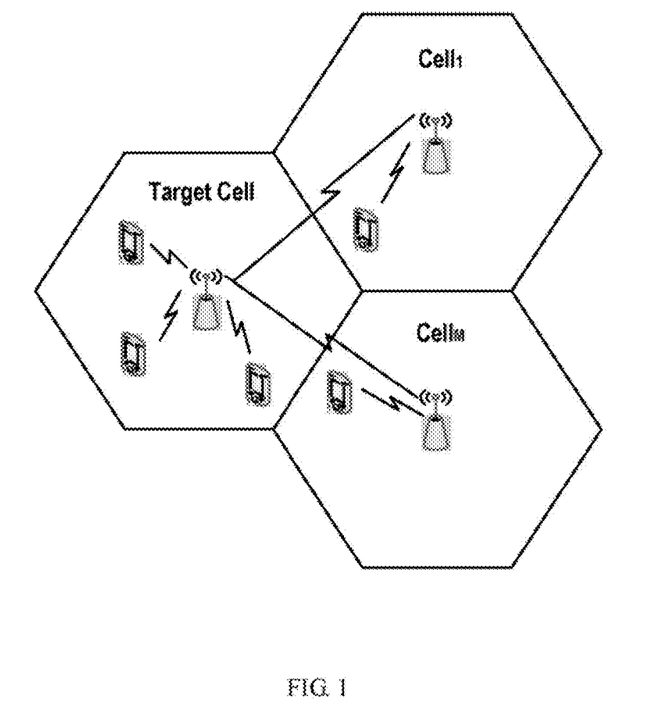
FIG. 1 schematically illustrates a diagram of system wherein embodiments of the present invention can be implemented.

Before specifically describing embodiments of the present invention, the architecture of a system in which the present invention can be implemented will be firstly described with reference to FIG. 1. As illustrated in FIG. 1, in the system, a target cell is surrounded by M other co-channel cells, $Cell_1, \ldots, Cell_M$. In the target cell, a number of co-channel MSs are served by only one BS. The BS is assumed to know the linear processing performed by the MSs, and in such a way the BS can acquire the required CSI and ICI matrix through a feedback channel from the MSs. By using multiple antennas at the BS of a cellular system, it can perform transmit precoding for simultaneous transmission to several co-channel mobile users. The precoder is designed in assuming a stationary scenario in which the fast (Rayleigh) fading is described by its second order properties. Additionally it also assumes narrow-band signals without anytime dispersion, i.e., the channel fading is frequency flat.

The illustrated system works in a FDD model where the BS has $N_t$ transmit antennas serving K MSs simultaneously in the same frequency band, while each MS is equipped with $N_r$ receive antennas and feeds back the CSI and ICI matrix through different channels in order to better protect the control information by avoiding collision.

For the j-th MS, the input signal, $x_j=[x_{j1};:;x_{jN_r}]^T \in C^{N_r \times 1}$, is first precoded by complex weights $W_j=[w_{j1}; ::: ; w_{jN_r}] \in C^{N_t \times N_r}$ before transmitted from the $N_t$ antennas at the BS. The corresponding output after precoding can be written as $$s_j = W_j x_j;\quad (1)$$

where $s_j \in C^{N_t \times 1}$. The received signals at the j-th MS, $y_j=[y_{j1}; ::::; y_{jN_r}]^T \in C^{N_r \times 1}$ can be then expressed as $$y_j = H_j W_j x_j + H_j \sum_{k \ne j}^{K} W_k x_k + \sum_{i=1}^{M} H'_{ji} s'_i + n_j \quad (2)$$

where $H_j=[h_{j1}, \ldots, h_{jN_r}]^T \in C^{N_r \times N_t}$ represents the channel coefficients from the BS to the j-th MS, $H_j W_j x_j$ is the wanted signal, $$H_j \sum_{k \ne j}^{K} W_k x_k$$

is the intracell interference of the other K-1 MSs' transmitting signals, $$\sum_{i=1}^{M} H'_{ji} s'_i$$

is the intercell interference from M co-channel cells around, and $n_j \in C^{N_r \times 1}$ is the AWGN noise with variance $\sigma^2$.

In studying the aforesaid system and the solutions which can solve or at least partially mitigate at least a part of problems in this system, the present inventors conceive the game theory. Game theory is a mathematical method for analyzing calculated circumstances (games) where a person's success is based upon the choices of others. Such a theory offers a set of mathematical tools to study the complex interactions among interdependent rational players and to predict their choices of strategies. In the present invention, the inventors propose a new approach for the feedback rate control problem in wireless systems based on a sequential second price auction. In this game, the feedback transmission resource such as feedback rate is divided into a certain amount of units, and preferably homogenous units. These resource units are then auctioned off one by one among the MSs with each biding round based on a second price auction, which means that a bidder with the highest price can get the object with the payment of the second highest price. The value of certain resource unit is quantified by for example the gain of channel capacity with this unit acquired. And the utility function, which every MS in the game tries to maximize, is defined as the total value of the feedback rate units obtained minus the total payments.

Figure 2:
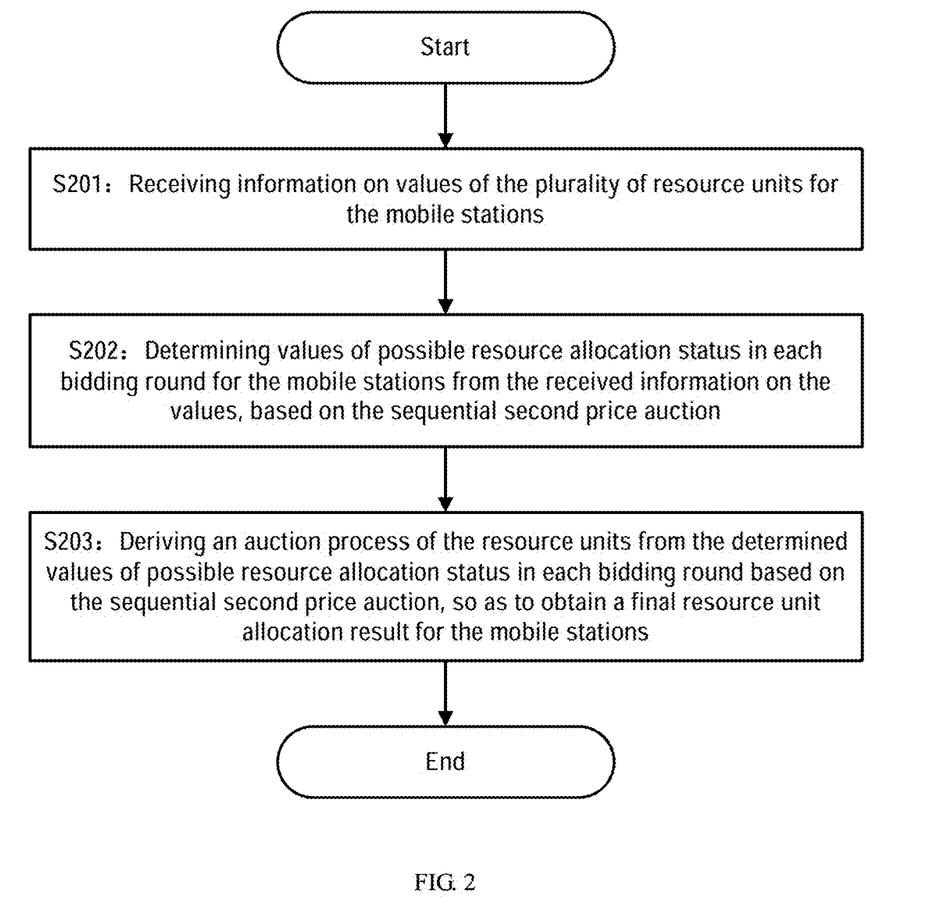
FIG. 2 schematically illustrates a flow chart of a method for allocating feedback transmission resource for mobile stations based on a sequential price auction according to an embodiment of the present invention.

Next, reference will be made to FIG. 2 to describe a method for allocation feedback transmission resource for the mobile station as provided in the present invention at length. FIG. 2 schematically illustrates a flow chart of a method for allocating feedback transmission resource for mobile stations based on a sequential price auction according to an embodiment of the present invention.

As illustrated in FIG. 2, first at step S201, the BS will receive information on values of a plurality of resource unit for the mobile stations.

As mentioned hereinbefore, in embodiments of the present invention, the feedback transmission resource such as feedback rate is divided into a plurality of resource units which are preferably homogeneous. Each mobile station in the target cell will determine the value of each of the resource units therefore, which is quantified by for example the gain of channel capacity with this unit acquired, i.e. the difference between the cannel capacity with this unit acquired and the channel capacity with this unit not acquired. The value of a resource unit is a measure of importance of a resource unit for a mobile station and thus it can be used as a basic factor for a mobile station in bidding the resource unit.

In an embodiment of the present invention, the values of the plurality of resource units for the mobile stations are determined under the condition that the feedback transmission resource is optimized among at least two kinds of different feedback information such as (but not limited to) channel state information and intercell interference information. In such a way, both for example CSI and ICI can be considered in the embodiments of the invention and the feedback resource is optimized therebetween.

More details about the determination of the values of the plurality of resource units for a mobile station will be described with reference to FIG. 4 and thus it will not be elaborated herein.

The information on values of the plurality resource units for each mobile station will be transmitted to the BS from the mobile stations and accordingly the BS will receive the information on values for each mobile station and use it for subsequent processing.

Then at step S202, values of possible resource allocation status in each bidding round for the mobile stations are determined from the received information on the values based on the sequential second price auction.

According to the present invention, all resource units will be auctioned off among the mobile stations one by one based on the second price auction, which is also called as "a sequential second price auction". The present invention is just based on the forecast of the sequential second price auction. In the auction, the feedback transmission resource R is divided into N resource units with a same size of $r_{unit}$=R/N the N resource units will be allocated to K MSs (or K agents for the K MSs) in sequential N bidding rounds. In each bidding round, each MS will bid based on the values of the best status and the second best status of all possible allocation status result for the MS in the round, the BS will allocate the auctioned resource unit to the MS with the largest bid but actually it will charge it the second largest bid instead of the largest one, in other word the MS with the largest bid will get the resource unit at the cost of the second largest bid. The auction will continue until all the resource units have been auctioned off.

If the auction process is given a graphic description, it can be represented by a K-ary tree. In the tree, each node represents a different status of the auctions in a biding round, and its children nodes represent the possible results in the next bidding round. Specifically, node S ($s_1, \ldots, s_j, \ldots, s_k$) represents an auction status where agent j has obtained $s_j$ resource units (j=1, 2, ..., K). The nodes in m-th layer represent all the possible results of allocating m units among K mobile stations. As the auction goes from round 1 to round N, the tree grows from the root node in 0-th layer to the leaves in the N-th layer.

In an auction, the result can be influenced mainly by the following three aspects, the value of each resource unit, the strategy of each mobile station and information condition. In the embodiments of the present invention, the utility function of the j-th agent can be given by the following equation:

$$U_j(m) = \sum_{i=1}^{m} v_j^i - \sum_{i=1}^{m} p_j^i \qquad (3)$$

wherein $v_j^i$ denotes the value of the i-th resource unit for the j-th mobile station and $p_j^i$ denotes the corresponding price for obtaining the i-th resource unit. The information on values of the plurality of resource units received at step S201 contains the information about $v_j^i$.

Additionally, it is assumed that the auction is a full information auction, which means every agent know the numbers of result units being sold, bidding histories, and the resource unit values for the other mobile stations. With this assumption, the sophisticated bidding which focuses on maximizing the agent's utility over the final outcome is the only strategy that will survive iterative elimination of weakly dominated strategies.

To this end, in embodiments of the present invention, the received information on the values are used to determined the values of possible resource allocation status in each bidding round for the mobile stations based on the sequential second price auction. These values of possible resource allocation status are essential in bidding for a mobile station.

In embodiments of the present invention, the values of possible resource allocation status in a final bidding round for the mobile stations can be determined first from the received information on the values and then based on the values in the final bidding round. Particularly, the values of possible resource allocation status in the final bidding round for the mobile stations can be determined through determining the values of resource units with the number of resource units as indicated by the possible resource allocation status being obtained by the respective mobile stations.

Then the values of possible resource allocation status in other bidding rounds for the mobile stations can be determined based on the sequential second price auction from the determined values of possible resource allocation status in the final bidding round, particularly, based on the determined values in the next or subsequent bidding round. Specifically, for values of a bidding round possible resource allocation status, bids of the mobile stations in the next bidding round will be first determined from values of possible resource allocation status in the next bidding round. In a bidding round, each mobile will bid based on the difference between the maximum value and the second maximum value of possible resource allocation status in the next bidding round for that mobile station. Then it will determine the mobile station who will win in the next bidding round from bids of the mobile stations, i.e., the mobile station who bids the largest. Next, the resulting resource allocation status if the mobile station wins in the next bidding round is determined for use in determining the values of possible resource allocation status of the present bidding round. For the mobile station who will win in the next bidding round, the value of the possible resource allocation status therefor in the present round can be determined as the value of the determined resulting resource allocation status for that winner mobile station minus the second largest bid of the bids of the mobile stations instead of the real bid of the mobile station because the auction is based on the second price auction strategy and the mobile will obtain the resource unit at the cost of second largest bid. For the mobile stations that will lose the values of the possible resource allocation status will be determined as the values of the resulting resource allocation status for these mobile stations because they will not get the resource unit and their respective values should be remained unchanged.

For describing the present invention more clearly so that the present invention can appreciate the spirit of present invention fully and thoroughly, an exemplary process will be described with reference to FIG. 3, which schematically illustrates a diagram of an exemplary tree representing all possible resource unit allocation status in each bidding round according to an embodiment of the present invention.

In the exemplary process, there are two mobile stations and two resource units and thus the values of the resource units for the two mobile stations can be represent by for example a table as illustrated at the left top of the figure. This table shows that the value of the first resource unit RU 1 for the first mobile station MS 1 is 7; the value of the second resource unit RU 2 for MS 1 is 6; the value of RU 1 for the second mobile station MS 2 is 5; and the value of RU 2 for MS 2 is 5.

Figure 3:
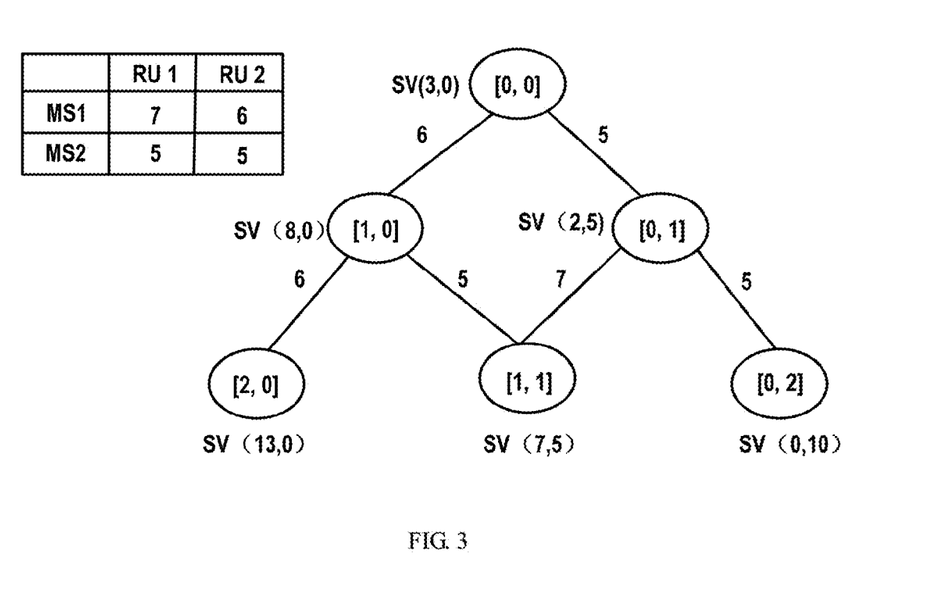
FIG. 3 schematically illustrates a diagram of an exemplary tree representing all possible resource unit allocation status in each bidding round according to an embodiment of the present invention.

Due to the fact that the number of the resource units is two, there will be two bidding rounds and thus there will be two layer nodes other than the root node in 0-th layer as illustrated in FIG. 3. In the tree, each node represent a possible resource unit allocation status, the number of the elements of a node is equal to that of mobile stations, and is 2 in the exemplary process. For example, root node [0, 0] represents that no node has been sold, node [1, 0] represents that one unit has been sold to MS 1, node [0, 1] represents that one unit has been sold to MS 2 and so on.

For the illustrated tree, firstly the values of resource unit allocation status corresponding to the leaves nodes (i.e., in the final (second) bidding round) are determined. For leaf node [2, 0], the value of this node for MS 1, i.e., the value of the corresponding resource unit allocation status for MS 1, can be computed as a sum of the value of RU 1 for MS 1 and the value of RU 2 for MS 1 (i.e., 13) because this node denotes that MS 1 obtains the two resource units, RU 1 and UR 2,; and for MS 2, the value is zero because MS 2 get no resource unit. Therefore, the value of leaf node [2, 0] can be determined as (13, 0). Similarly, the value of leave nodes [1, 1] and [0, 2] can be determined as (7, 5) and (0, 10) respectively.

Next, for the first layer nodes representing possible allocation result in the first bidding round, the values thereof will be determined based on those of the leaves nodes. Specifically, the bid of each mobile station in the final round will be determined first based on the values of the leaves nodes and particularly based on the difference between the largest value and the second largest value of the values of the leaves nodes for the each mobile station.

For example, if it is intended to calculate the value of node [1, 0], the bids of two MSs will be determined first. In this case, MS 1's bid in the final round will be the difference between the 13 and 7 and MS 2's bid will be the difference between 5 and 0, that is to say, the bids of MS 1 and MS 2 are 6 and 5 respectively, as illustrated near the lines from node [1, 0] to nodes [2, 0] and [1, 1] in the FIG. 3. Hence, in such a case, MS 1 will win and the resulting resource unit allocation status will be represented by node [2, 0]. Accordingly, the value of node [1, 0] will be determined based on the value of node [2, 0], i.e., (13, 0). In view of the fact that, according to the second price auction, MS 1 will obtain the resource unit by paying the second largest bid, the value for MS 1 should be the value of node [2, 0] for MS 1 minus the real price it pays (i.e., the second largest bid) and thus it is the result of subtracting 5 from 13, i.e. 8. On the other hand, since MS 2 will not obtain the resource unit, the value for MS 2 will be maintained and thus is zero. In such a way, it will determine the value of node [1, 0] as (8, 0).

Similarly, for node [0, 1], the bids of MS 1 and MS 2 in the final round will be determined as 7 and 5 respectively, which means MS 1 will win in the round and thus based on the values of node [1,1], the value of node [0, 1] can be determined as 2 and 5 respectively. Additionally, it can also determine the value of the root node similarly as (3, 0) although it is not necessary to do so. In such a way, values of all nodes in the tree can be determined.

Referring back to FIG. 2, after that, at step S203, an auction process of the resource units will be derived from the determined values of possible resource allocation status in each bidding round based on the sequential second price auction, so as to obtain a final resource unit allocation result for the mobile stations.

The auction process of the resource units can be derived through determining resulting resource allocation status in each bidding round from the values of possible resource allocation status in each bidding round as determined at step S202, based on the sequential second price auction. And then, a resulting resource allocation status in a final bidding round can be determined as the final resource unit allocation result for the mobile stations.

Taking the process illustrated in FIG. 3 as an example, in the first round, MS 1 will bid 6 for the first resource unit and MS 2 will bid 5 for this unit and thus MS 1 will win the first bidding round and the process will proceed into the status represent by node [1, 0]. In the second round which is also the final round, MS 1 will bid 6 for the second resource unit while MS 2 will bid 5 for it, and thus MS 1 wins in the final round. Therefore the final auction result is the status represented by node [2, 0], i.e., MS will obtain the two resource units and this result will be taken as the final resource unit allocation result.

Through the process described above, the BS can determine how to allocate the feedback transmission resource for the mobile stations. The final resource unit allocation result can be transmitted to the mobile stations to notify them of the number of resource unit that have allocated thereto. The mobile station will transmit feedback information such as CSI and ICI using the allocated resource units.

Hereinafter, reference will made to FIG. 4 to describe the method of providing information on values of feedback transmission resource for a mobile station as provided in the present invention.

Figure 4:
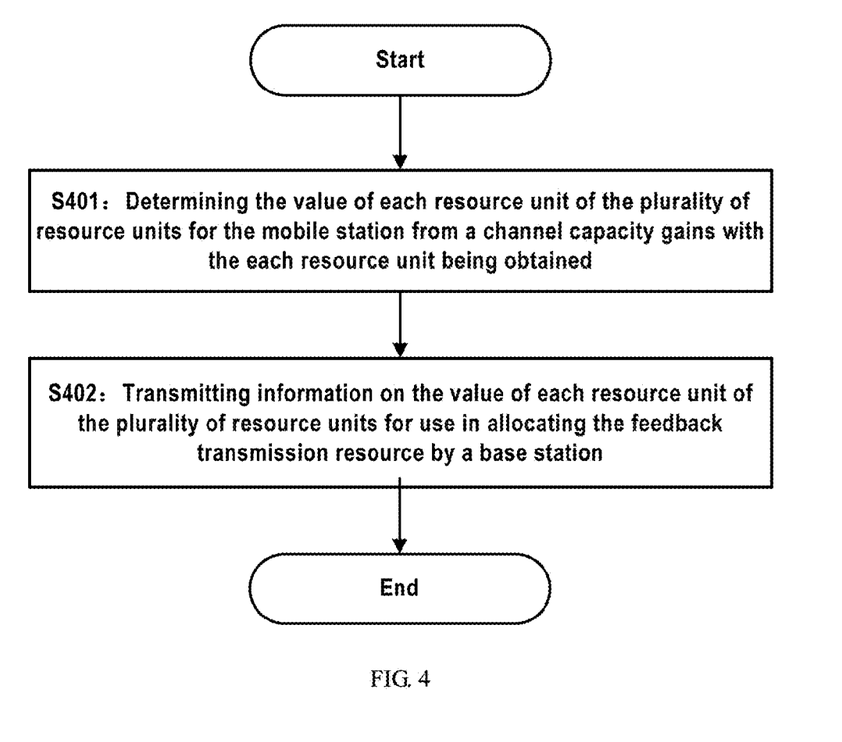
FIG. 4 schematically illustrates a flow chart of a method for providing information on feedback transmission resource for a mobile station according to an embodiment of the present invention.

As illustrated in FIG. 4, first at step S401, it determines the value of each resource unit of the plurality of resource units for the mobile station from a channel capacity gain with the each resource unit being obtained, i.e. the difference between the channel capacity with the each resource unit being obtained and a channel capacity with the each resource unit not being obtained. That is to say, the value of the i-th resource for the j-th mobile station can be expressed by the following equation:

$$v_j^i = \sum_{r_j=i*r_{unit}} Cj - \sum_{r_j=(i-1)*r_{unit}} Cj \qquad (4)$$

wherein $r_j$ is the total feedback transmission resource for the j-th mobile station, $C_j$ is the channel capacity with $r_j$ obtained. In a preferable embodiment, the $v_j^i$ can be determined under the condition that the feedback transmission resource is optimized among at least two kinds of different feedback information such as (but not limited to) CSI and ICI, i.e., $v_j^i$ can be given as follows:

$$v_j^i = \max_{r_j+r'_j=i*r_{unit}} Cj - \max_{r_j+r'_j=(i-1)*r_{unit}} Cj \qquad (5)$$

where $r_j$ is the feedback transmission resource for CSI and $r'_j$ is the feedback transmission resource for ICI.

Actually, the calculation of the channel capacity $C_j$ is known in the art, but for the purpose of explanation and completeness, an example of calculation of $C_j$ will be described hereinafter.

First, it has been known that the channel capacity $C_j$ for the j-the mobile station can be expressed as follows:

$$C_j = W \log_2(1+\gamma_j) \qquad (6)$$

where W is the down link bandwidth and $\gamma_j$ is the signal to noise plus interference ratio (SINR) of the j-th mobile station. As mentioned hereinbefore, the received signals at the j-th MS $\gamma_j$ can be expressed by equation (2) and accordingly, the SINR $\gamma_j$ the j-th mobile station can be written as:

$$\gamma_j = \frac{\|H_j W_j x_j\|^2}{\left\|H_j \sum_{k \neq j}^{K} W_k x_k\right\|^2 + \left\|\sum_{i=1}^{M} H'_{ji} s'_i\right\|^2 + \sigma^2} \qquad (7)$$

In a closed-loop wireless communication system, the MS will feed the quantized CSI matrix back to the BS so as to perform a transmit percoding. For the purpose of simplicity and without loss of generality, the path loss can be not considered. Therefore, here it will use the equivalent quantized feedback channel by transforming the real channel matrix in terms of feedback rate and distortion. Through CSI quantization, the real channel output for the i-th receive antenna of the j-th MS, denoted by $h_{ji} \in C^{N_t \times 1}$ can be for example modeled as $$h_{ji} = \bar{h}_{ji} + \sqrt{D_{ji}} g \qquad (8)$$

where $\bar{h}_{ji} \in C^{N_t \times 1}$ represents the quantized feedback channel output with zero mean and variance $1-D_j$; $g \in C^{N_t \times 1}$ is an independent additive noise matrix with each entry corresponding to an i.i.d. Gaussian variable with zero means and unit variance and $D_{ji} = \text{var}[h_{ji} \ \bar{h}_{ji}]$ represents the channel quantization distortion which is used to measure the quality of feedback information.

Then it is assumed that the quantized CSI can be modeled for example as follows:

$$\bar{h}_{ji} = \mu h_{ji} + \upsilon g \qquad (9)$$

where parameters µ and υ are the functions of $D_{ji}$. The parameter µ can be simply expressed by the following linear function:

$$\mu = x + y\, D_{ji} \quad (10)$$

Additionally, it is known that the real channel output $h_{ji}$ and its corresponding quantized channel $\bar{h}_{ji}$ satisfy the following linear extreme conditions:
When there is no quantization errors, i.e., µ=1 and υ=$D_{ji}$=0, then x=1
When the quantization is completely inaccurate, i.e., µ=0 and υ=$D_{ji}$=1, then y=−1.
So it will have the following relationship:

$$\mu = 1 - D_{ji} \quad (10)$$

As $h_{ji}$ and g are independent with each other, and thus it can have the flowing equation:

$$\text{var}[\bar{h}_{ji}] = \text{var}[\mu h_{ji}] - \text{var}[\upsilon g] \quad (11)$$
$$\Rightarrow 1 - D_{ji} = \mu^2 + \upsilon^2$$
$$\Rightarrow \upsilon = \sqrt{D_{ji} - (1 - D_{ji})}$$

Based on the Shannon's rate-distortion theory of continuous-amplitude sources, the rate-distortion function of a zero-mean and unit variance complex Gaussian source can be given by:

$$r_{ji} = \log_2\left(\frac{1}{D_{ji}}\right) \quad (12)$$

wherein $r_{ji}$ represents the feedback rate of CSI for the i-th receive antenna of the j-th mobile station. So the quantized CSI matrix $\bar{h}_{ji}$ can be expressed as a function of the feedback rate $r_{ji}$:

$$\bar{h}_{ji} = (1 - 2^{-r_{ji}}) h_{ji} + \sqrt{2^{-r_{ji}}(1 - 2^{-r_{ji}})} g \quad (13)$$

Additionally, in preferable embodiment of the present invention, the j-th MS will also feed back ICI information i.e., the quantized ICI matrix, and hence the total interference can be reflected by one interference matrix $H'_j = [h'_{j1}, \ldots, h'_{jNr}] \in C^{Nt \times Nr}$. With similar analysis, it can have $$\bar{h}'_{j1} = (1 - 2^{-r'_{ji}}) h'_{ji} + \sqrt{2^{-r'_{ji}}} k_i g \quad (14)$$

where $\bar{H}'_j = [\bar{h}'_{j1}, \ldots, \bar{h}'_{jNr}] \in C^{Nt \times Nr}$ represents the quantized interference matrix, $k_i$ is a scalar parameter with $\text{var}[h'_{ji}] = k_i^2$ and $r'_{ji}$ represents the feedback rate of interference matrix for the i-th receive antenna of the j-th mobile station.

For the purpose of simplicity and without loss of generality, it can only consider a sub-optimal MMSE based precoder design and the general form for a sub-optimal linear precoder $W_j = [w_{j1}, \ldots w_{jk}]$ can be written as $$W_j = \bar{H}_j^H (\bar{H}_j \bar{H}_j^H + \bar{H}'_j \bar{H}_j^{'H} + \sigma^2 I)^{-1} \quad (15)$$

Due to the fact that both $\bar{H}_j$ and $\bar{H}'_j$ are functions of the feedback rate, the weight matrix for the precoder $W_j$ is also related to the feedback rate. Therefore, the SINR $\gamma_j$ in equation (7) is also a function of the feedback rate and thus the channel capacity can be determined and in turn the value of resource unit for the mobile can be determined accordingly.

In a case that ICI is not considered, the optimal MMSE precoder can be written in a following form:

$$W = \bar{H}_j^H (\bar{H}_j \bar{H}_j^H + \sigma^2 I)^{-1} \quad (16)$$

where $W \in C^{Nt \times Nt}$ represents the total weight matrix of the precoder, and $\bar{H} \in C^{Nt \times Nt}$ is the total quantized feedback channel output. For this precoder, the received signals at all MSs, $y = [y_1, \ldots, y_{Nt}] \in C^{Nr \times 1}$, can be written in a following matrix form:

$$y = HWx + \sum_{i=1}^{M} H'_i s'_i + n \quad (17)$$

where $H \in C^{Nt \times Nt}$ is the total real feedback channel output, $$\sum_{i=1}^{M} H'_i s'_i$$

is intercell interference and $n \in C^{Nr \times 1}$ is the AWGN noise with variance $\sigma^2$. Accordingly, SINR of the j-th MS can also be computed according to equation (7), but $W_j$ will be replaced with $W = [W_1, \ldots, W_k]$.

Therefore, based on the above solution, the values of the resource units for the mobile station can be determined.

Next, referring back to FIG. 4, at step S402, information on the value of each resource unit of the plurality of resource units will be transmitted to for example the BS for use in allocating the feedback transmission resource by a base station. The BS will allocate the feedback transmission resource based on the information as described with reference to FIGS. 2 to 3.

Hereinafter, reference will be made to FIGS. 5A to 5C to shown the simulation results of the present invention. In the simulations, for the purpose of simplicity, the path loss is not considered; the transmitting power is normalized as 0 dBm and the noise power $\sigma^2 = -80$ dB; the receive antennas of each MS is fixed as Nr=2; the total feedback rate R=60; and the bandwidth W=1000 kHz.

Figure 5A:
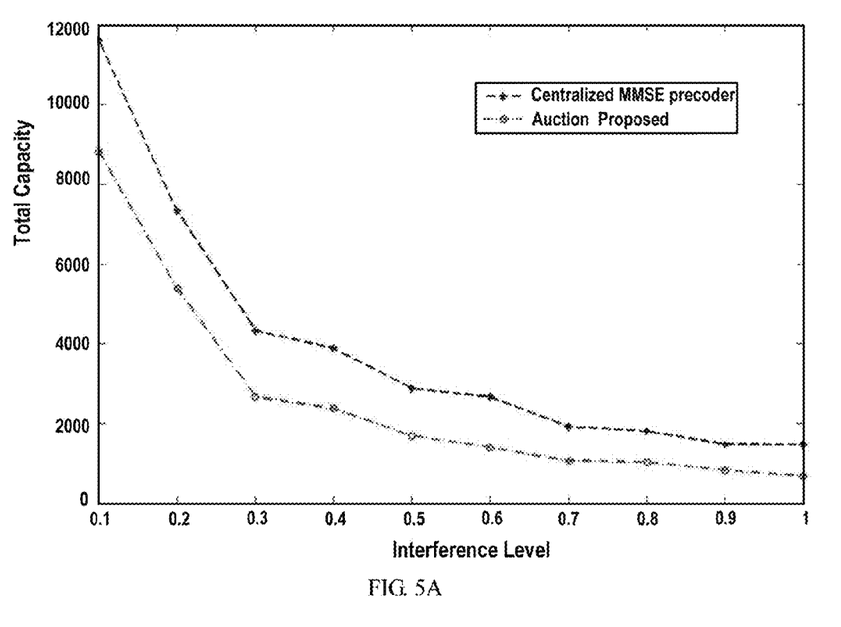
FIGS. 5A to 5C illustrate graphs of results of simulations of embodiments of the present application.

First referring to FIG. 5A, FIG. 5A illustrates the total channel capacity with varying interference level by using conventional centralized MMSE precoder and the solution provided in the present invention, wherein the number of the mobile stations K is 4 and the feedback rate R is divided into 6 units. As illustrated in FIG. 5A, the total capacity is shown from the interfering levels k=0.1 to k=1, i.e., from a low level interference to a high level interference, where interference and wanted are almost similar. From the figure it can be seen that the proposed solution in the present invention can achieve almost same channel capacity as the conventional MMSE precoder.

Figure 5B:
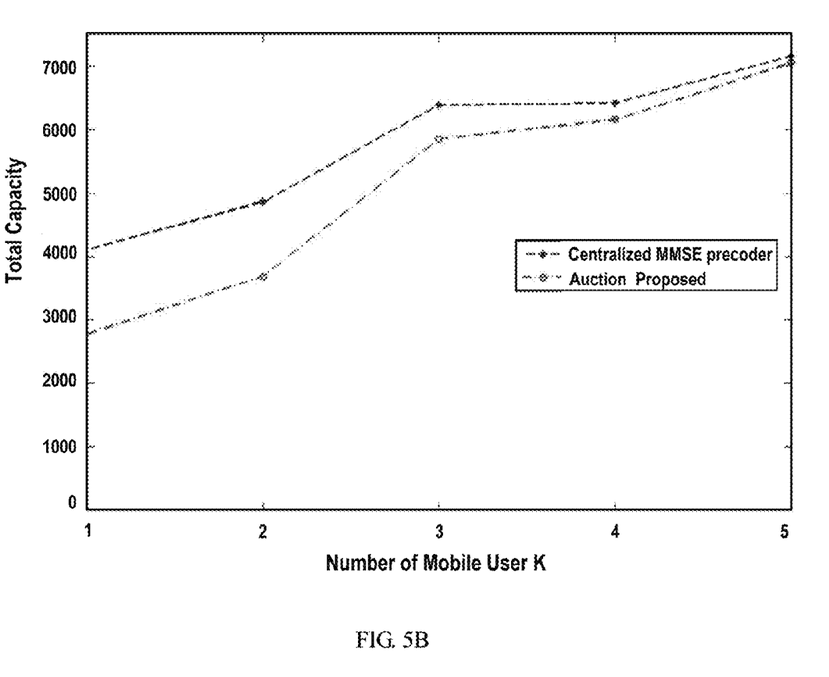

Reference is then made to FIG. 5B, which illustrates the total channel capacity with the varying number of mobile stations K, wherein the interfering level k equals 0.1 and the feedback rate R is divided into 6 units. As is seen from the figure, the capacity of the proposed solution is almost the same as conventional MMSE precoder and the difference between them becomes smaller as the number of the mobile stations k increases, which means that, as the number of the mobile stations increases, the auction becomes more intense and brings the result that the total feedback rate is used more efficiently, in other word, the advantage of the auction is activated by the increasing mobile stations.

Figure 5C:
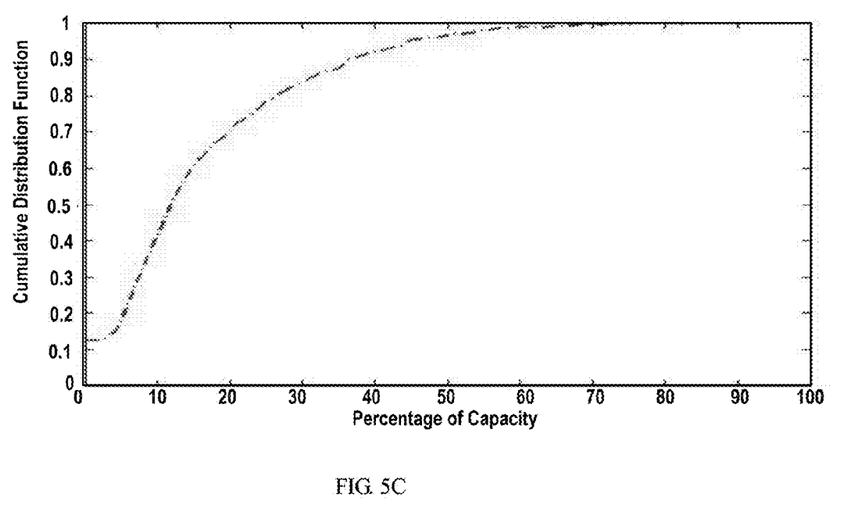

FIG. 5C illustrate a graph of the cumulative distribution function of the total capacity using the proposed solution in the present invention wherein the interfering level k equals 0.1, the number of the mobile stations K is 4, and the feedback rate R is divided into 6 units. As seen from the figure, the curve is very steep at the region of about 10% to 30%, which is around the average percentage of each MS (100%/K=100%/6≈17%). This means that all feedback rate units are spread among all MSs and unwanted unfair allocation does not appear and the proposed solution in the present invention can achieve fairness among the MSs.

According to the embodiments of the present invention, MS will determined the values of the resource units and transmitted to the BS, and the BS will allocate the resource unit from the information on the values based on the sequential second price auction strategy. Therefore, it is possible to improve performance in sum channel capacity and at the same time it can achieve preservation in fairness among MSs. In preferred embodiments of the present invention, the feedback transmission resource can be optimized between at least two kinds of feedback information such as channel station information and intercell interference information, which will further improve the system performance.

Additionally, the present invention also provides an apparatus for allocating feedback transmission resource for mobile stations based on a sequential second price auction and an apparatus for providing information on values of feedback transmission resource for a mobile station. Hereinafter, reference will be made to FIGS. 6 and 7 to describe the apparatuses.

Figure 6:
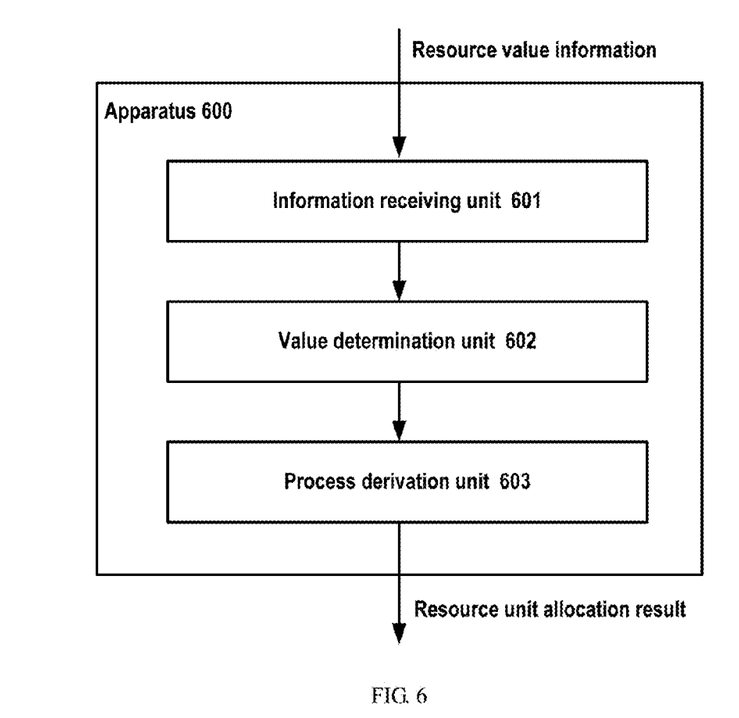
FIG. 6 illustrates a block diagram of an apparatus for allocating feedback transmission resource for mobile stations based on a sequential price auction according to an embodiment of the present invention.

As illustrated in FIG. 6, apparatus 600 can comprise information receiving unit 601, value determination unit 602 and process derivation unit 603. The information receiving unit 602 is configured for receiving information on values of the plurality of resource units for the mobile stations. The value determination unit 602 is configured for determining values of possible resource allocation status in each bidding round for the mobile stations from the received information on the values based on the sequential second price auction. The process derivation unit 603 is configured for deriving an auction process of the resource units from the determined values of possible resource allocation status in each bidding round based on the sequential second price auction, so as to obtain a final resource unit allocation result for the mobile stations. In embodiments of the present invention, the feedback transmission resource can comprise any of feedback rate and feedback bandwidth, and the plurality of resource units preferable can have a same size, i.e., they are homogenous.

In an embodiment of the present invention, the values of the plurality of resource units for the mobile stations can be channel capacity gains with respective resource units, the values of the plurality of resource units for the mobile stations can be determined under the condition that the feedback transmission resource is optimized among at least two kinds of different feedback information. The at least two kinds of different feedback information can comprise but not limited to channel state information and intercell interference information.

In another embodiment of the present invention, the value determination unit 602 is configured for determining the values of possible resource allocation status in a final bidding round for the mobile stations from the received information on the values; and determining the values of possible resource allocation status in other bidding rounds for the mobile stations from the determined values of possible resource allocation status in the final bidding round based on the sequential second price auction. Particularly, the value determination unit 602 can be configured for determining the values of possible resource allocation status in the final bidding round for the mobile stations from the received information on the values by determining the values for respective mobile stations with the number of resource units as indicated by the possible resource allocation status being obtained by the respective mobile stations. Beside, the value determination unit 602 can be configured for determining the values of possible resource allocation status in other bidding rounds for the mobile stations by: for a bidding round, determining bids of the mobile stations in the next bidding round from values of possible resource allocation status in the next bidding round; determining the mobile station who will win in the next bidding round from bids of the mobile stations and the resulting resource allocation status if the mobile station wins; determining the value of the possible resource allocation status in the bidding round for the mobile station who will win as the value of the resulting resource allocation status for the mobile station minus the second maximum bid of the bids of the mobile stations; and determining the values of the possible resource allocation status in the bidding round for the mobile stations who will lose as the values of the resulting resource allocation status for these mobile stations.

In a further embodiment of the present invention, the process derivation unit 603 is configured for: determining resulting resource allocation status in each bidding round from the determined values of possible resource allocation status based on the sequential second price auction; and determining a resulting resource allocation status in a final bidding round as the final resource unit allocation result for the mobile stations.

Figure 7:
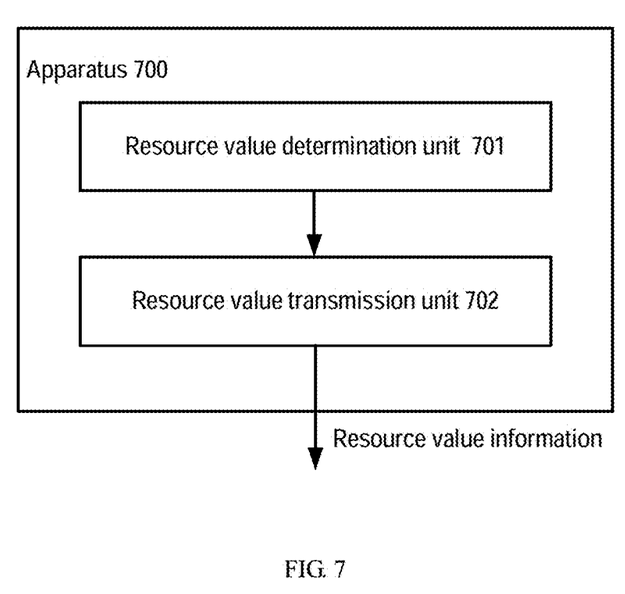
FIG. 7 illustrates a block diagram of an apparatus for providing information on feedback transmission resource for a mobile station according to an embodiment of the present invention.

Next reference is made to FIG. 7. As illustrated, apparatus 700 can comprise resource value determination unit 701 for determining the value of each resource unit of the plurality of resource units for the mobile station from a channel capacity gain with the each resource unit being obtained and resource value transmission unit 702 for transmitting information on the value of each resource unit of the plurality of resource units for use in allocating the feedback transmission resource by a base station. Preferably, the resource value determination unit can be configured for determining the values of each resource unit of the plurality of resource units for the mobile stations under the condition that the feedback transmission resource is optimized among at least two kinds of different feedback information.

In an embodiment of the present invention, the at least two kinds of different feedback information can comprise channel state information and intercell interference information.

In another embodiment of the present invention, the feedback transmission resource can comprise any of feedback rate and feedback bandwidth, and the plurality of resource units preferable can have a same size, i.e., they are homogenous.

Besides, it should be noted that operations of respective units as comprised in the apparatus 600 and unit 700 substantially correspond to operations in respective method steps as previously described. Therefore, for detailed operations of respective units in the apparatuses 600 and 700, please refer to the previous descriptions of the methods of the present invention with reference to FIGS. 1 to 5C.

Additionally, the present invention is described mainly with reference with the feedback transmission resource such as feedback rate, but the present invention is not limited thereto. Actually, the skilled in the art can readily appreciated that it can also be true for other transmission resource such as feedback bandwidth and etc.

In embodiments of the present invention, description is made by taking homogenous resource units as an example, but actually, the feedback resource can also be divided into unequal units. In such a case, it is also feasible although information on values of resource units will increase substantially and the auction process will be more complex.

Moreover, in description of the embodiments of the present invention, the feedback information is described with reference to CSI and ICI, but the present invention is not limited thereto. The present invention can also be used to allocate the feedback transmission resource for any other feedback information beside CSI and ICI.

Additionally, a 2-ray tree is taken as an example to describe the auction process, but it is only for the purpose of illustration. In a real application scenario of the present invention, the number of mobile stations and the number of resource units will be much more, and the tree will have more braches and more layers.

By far, the present invention has been described with reference to the accompanying drawings through particular preferred embodiments. However, it should be noted that the present invention is not limited to the illustrated and provided particular embodiments, but various modification may be made within the scope of the present invention.

Further, the embodiments of the present invention can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may appreciate that the above method and system can be implemented with a computer-executable instructions and/or control codes contained in the processor, for example, such codes provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry, for example a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software, for example by firmware.

Though the present invention has been described with reference to the currently considered embodiments, it should be appreciated that the present invention is not limited the disclosed embodiments. On the contrary, the present invention is intended to cover various modifications and equivalent arrangements falling within in the spirit and scope of the appended claims. The scope of the appended claims is accorded with the broadest explanations and covers all such modifications and equivalent structures and functions.

What is claimed is:

1. A method of allocating a feedback transmission resource for mobile stations based on a sequential second price auction, wherein the feedback transmission resource is divided into a plurality of resource units, the method comprising:
    receiving, from each of the mobile stations, information on values of the respective plurality of resource units for a respective one of the mobile stations, each of the values being a difference between a channel capacity with a respective one of the plurality of resource units being obtained and a channel capacity with the respective one of the plurality of resource units not being obtained;
    determining values of respective possible resource allocation statuses in each bidding round for the respective mobile stations from the received information on the values, based on the sequential second price auction; and
    deriving an auction process of the plurality of resource units from the determined values of the respective possible resource allocation statuses in each bidding round, based on the sequential second price auction, to obtain a final resource unit allocation result for the mobile stations.

2. The method of claim 1, wherein the values of the respective plurality of resource units for each of the mobile stations are determined under a condition that the feedback transmission resource is optimized among at least two kinds of different feedback information.

3. The method of claim 1, wherein the determining the values of the respective possible resource allocation statuses in each bidding round for the respective mobile stations comprises:
    determining the values of the respective possible resource allocation statuses in a final bidding round for the respective mobile stations from the received information on the values; and
    determining the values of the respective possible resource allocation statuses in another bidding round before the final bidding round for the respective mobile stations from the determined values of the respective possible resource allocation statuses in the final bidding round based on the sequential second price auction.

4. The method of claim 3, wherein the determining the values of the respective possible resource allocation statuses in the final bidding round for the respective mobile stations from comprises:
    determining a value of allocating the plurality of resource units to a first mobile station, among the mobile stations, in the final bidding round to be equal to a sum of the values of the respective plurality of resource units for the first mobile station;
    determining a value of allocating the plurality of resource units to a second mobile station, among the mobile stations, in the final bidding round to be equal to a sum of the values of the respective plurality of resource units for the second mobile station; and
    determining values of allocating a first resource unit, among the plurality of resource units, to the first mobile station and the second mobile station, respectively, in the final bidding round to be equal to the values of the first resource unit for the first mobile station and the second mobile station, respectively.

5. The method of claim 3, wherein the determining the values of the respective possible resource allocation statuses in the other bidding round for the respective mobile stations comprises:
    determining bids of the respective mobile stations in the final bidding round from the determined values of the respective possible resource allocation statuses in the final bidding round for the respective mobile stations;
    determining a mobile station who will win in the final bidding round from the determined bids of the respective mobile stations;
    determining the value of the possible resource allocation status in the other bidding round for the mobile station who will win as the determined value of the possible resource allocation status in the final bidding round for the mobile station who will win, if the mobile station who will win wins, minus a second maximum bid of the determined bids of the respective mobile stations; and determining the value of the possible resource allocation status in the other bidding round for the mobile station who will lose as the determined value of the possible resource allocation status in the final bidding round for the mobile station who will lose, if the mobile station who will win wins.

6. The method of claim 1, wherein the deriving comprises:
determining a resulting resource allocation status in each bidding round from the determined values of the respective possible resource allocation statuses, based on the sequential second price auction; and
determining a resulting resource allocation status in a final bidding round as the final resource unit allocation result for the mobile stations.

7. The method of claim 2, wherein the at least two kinds of different feedback information comprises channel state information and intercell interference information.

8. The method of claim 1, wherein the feedback transmission resource comprises at least one among a feedback rate and a feedback bandwidth, and each of the plurality of resource units has a same size.

9. A method of providing information on values of a feedback transmission resource for a mobile station, wherein the feedback transmission resource is divided into a plurality of resource units, the method comprising:
determining a value of each of the plurality of resource units for the mobile station, the value being a difference between a channel capacity with a respective one of the plurality of resource units being obtained and a channel capacity with the respective one of the plurality of resource units not being obtained; and
transmitting, to a base station, information on the value of each of the plurality of resource units for use in allocating the feedback transmission resource by the base station.

10. The method of claim 9, wherein the value of each of the plurality of resource units for the mobile station is determined under a condition that the feedback transmission resource is optimized among at least two kinds of different feedback information.

11. The method of claim 10, wherein the at least two kinds of different feedback information comprise channel state information and intercell interference information.

12. The method of claim 9, wherein the feedback transmission resource comprises at least one among a feedback rate and a feedback bandwidth, and
each of the plurality of resource units has a same size.

13. An apparatus for allocating a feedback transmission resource for mobile stations based on a sequential second price auction, wherein the feedback transmission resource is divided into a plurality of resource units, the apparatus comprising:
a processor implementing:
information receiving unit configured to receive, from each of the mobile stations, information on values of the respective plurality of resource units for a respective one of the mobile stations, each of the values being a difference between a channel capacity with a respective one of the plurality of resource units being obtained and a channel capacity with the respective one of the plurality of resource units not being obtained;

value determination unit configured to determine values of respective possible resource allocation status in each bidding round for the respective mobile stations from the received information on the values based on the sequential second price auction; and
process derivation unit configured to derive an auction process of the plurality of resource units from the determined values of the respective possible resource allocation statuses in each bidding round, based on the sequential second price auction, to obtain a final resource unit allocation result for the mobile stations.

14. The apparatus of claim 13, wherein the values of the respective plurality of resource units for each of the mobile stations are determined under a condition that the feedback transmission resource is optimized among at least two kinds of different feedback information.

15. The apparatus of claim 13, wherein the value determination unit is further configured to:
determine the values of the respective possible resource allocation statuses in a final bidding round for the respective mobile stations from the received information on the values; and
determine the values of the respective possible resource allocation statuses in another bidding round before the final bidding round for the respective mobile stations from the determined values of the respective possible resource allocation statuses in the final bidding round, based on the sequential second price auction.

16. The apparatus of claim 15, wherein the value determination unit is further configured to:
determine a value of allocating the plurality of resource units to a first mobile station, among the mobile stations, in the final bidding round to be equal to a sum of the values of the respective plurality of resource units for the first mobile station;
determine a value of allocating the plurality of resource units to a second mobile station, among the mobile stations, in the final bidding round to be equal to a sum of the values of the respective plurality of resource units for the second mobile station; and
determine values of allocating a first resource unit, among the plurality of resource units, to the first mobile station and the second mobile station, respectively, in the final bidding round to be equal to the values of the first resource unit for the first mobile station and the second mobile station, respectively.

17. The apparatus of claim 15, wherein the value determination unit is further configured to:
determine bids of the respective mobile stations in the final bidding round from the determined values of the respective possible resource allocation statuses in the final bidding round for the respective mobile stations;
determine a mobile station who will win in the final bidding round from the determined bids of the respective mobile stations;
determine the value of the possible resource allocation status in the other bidding round for the mobile station who will win as the determined value of the possible resource allocation status in the final bidding round for the mobile station who will win, if the mobile station who will win wins, minus a second maximum bid of the determined bids of the respective mobile stations; and
determine the value of the possible resource allocation status in the other bidding round for the mobile station who will lose as the determined value of the possible resource allocation status in the final bidding round for the mobile station who will lose, if the mobile station who will win wins.

18. The apparatus of claim 13, wherein the process derivation unit is further configured to:

determine a resulting resource allocation status in each bidding round from the determined values of the respective possible resource allocation statuses, based on the sequential second price auction; and determine a resulting resource allocation status in a final bidding round as the final resource unit allocation result for the mobile stations.

19. The apparatus of claim 14, wherein the at least two kinds of different feedback information comprises channel state information and intercell interference information.

20. The apparatus of claim 13, wherein the feedback transmission resource comprises at least one among a feedback rate and a feedback bandwidth, and each of the plurality of resource units has a same size.

21. An apparatus for providing information on values of a feedback transmission resource for a mobile station, wherein the feedback transmission resource is divided into a plurality of resource units, the apparatus comprising:

a processor implementing:

resource value determination unit configured to determine a value of each of the plurality of resource units for the mobile station, the value being a difference between a channel capacity with a respective one of the plurality of resource units being obtained and a channel capacity with the respective one of the plurality of resource units not being obtained; and resource value transmission unit configured to transmit, to a base station, information on the value of each of the plurality of resource units for use in allocating the feedback transmission resource by the base station.

22. The apparatus of claim 21, the value of each of the plurality of resource units for the mobile station is determined under a condition that the feedback transmission resource is optimized among at least two kinds of different feedback information.

23. The apparatus of claim 22, wherein the at least two kinds of different feedback information comprise channel state information and intercell interference information.

24. The apparatus of claim 21, wherein the feedback transmission resource comprises at least one among a feedback rate and a feedback bandwidth, and each of the plurality of resource units has a same size.

25. The method of claim 3, wherein the determining the values of the respective possible resource allocation statuses in the final bidding round for the respective mobile stations comprises:

determining a first leaf node comprising:
a value of allocating the plurality of resource units to a first mobile station, among the mobile stations, in the final bidding round that is equal to a sum of the values of the respective plurality of resource units for the first mobile station; and
a value of allocating none of the plurality of resource units to a second mobile station, among the mobile stations, in the final bidding round that is equal to zero;

determining a second leaf node comprising:
a value of allocating the plurality of resource units to the second mobile station in the final bidding round that is equal to a sum of the values of the respective plurality of resource units for the second mobile station; and
a value of allocating none of the plurality of resource units to the first mobile station in the final bidding round that is equal to zero;

determining a third leaf node comprising values of allocating a first resource unit, among the plurality of resource units, to the first mobile station and the second mobile station, respectively, in the final bidding round that is equal to the values of the first resource unit for the first mobile station and the second mobile station, respectively.

26. The method of claim 25, wherein the determining the values of the respective possible resource allocation statuses in the other bidding round for the respective mobile stations comprises:

determining a first bid for allocating a second resource unit, among the plurality of resources units, to the first mobile station to be equal to the value of allocating the plurality of resource units to the first mobile station minus the value of the first resource unit for the first mobile station;

determining a second bid for allocating the second resource unit to the second mobile station to be equal to the value of allocating the plurality of resource units to the second mobile station minus the value of the first resource unit for the second mobile station;

determining a third bid for allocating the first resource unit to the second mobile station to be equal to the value of the first resource unit for the second mobile station;

determining a fourth bid for allocating the first resource unit to the first mobile station to be equal to the value of the first resource unit for the first mobile station; and determine the values of the respective possible resource allocation statuses in the other bidding round for the respective mobile stations from the determined first bid, second bid, third bid, and fourth bid.

* * * * *

UNITED STATES PATENT AND TRADEMARK OFFICE
CERTIFICATE OF CORRECTION

PATENT NO. : 9,553,705 B2
APPLICATION NO. : 13/995818
DATED : January 24, 2017
INVENTOR(S) : Dalin Zhu et al.

Page 1 of 1

It is certified that error appears in the above-identified patent and that said Letters Patent is hereby corrected as shown below:

In the Specification

Column 5, Line 15-16:
"$W_j = [w_{j1}; \cdots ; w_{jNr}] \in C^{Nt \times Nr}$" should be -- $W_j = [w_{j1}; \cdots ; w_{jNr}] \in C^{Nt \times Nr}$ --, Column 6, Line 57:
After "$r_{unit}=R/N$", insert --and--, Column 8, Line 53:
"UR 2,; and" should be --RU 2--, Column 10, Line 23:
"ICI ." should be --ICI.--, Column 10, Line 61:
"$D_{ji} = \text{var } [h_{ji} \; \bar{h}_{ji}]$," should be -- $D_{ji} = \text{var } [h_{ji} - \bar{h}_{ji}]$ --, Column 11, Line 49:
"$\bar{h}'_{j1} = (1-2^{-r_{ji}})h'_{ji} + \sqrt{2^{-r_{ji}}}k_j g$" should be -- $\bar{h}'_{ji} = (1-2^{-r_{ji}})h'_{ji} + \sqrt{2^{-r_{ji}}}k_j g$ --, Column 11, Line 50:
"$\bar{H}'_j = [\bar{h}'_{ji}, \ldots, \bar{h}'_{jNr}] \in C^{Nt \times Nr}$" should be -- $\bar{H}'_j = [\bar{h}'_{j1}, \ldots, \bar{h}'_{jNr}] \in C^{Nt \times Nr}$ --.

Signed and Sealed this
Fourteenth Day of August, 2018

Andrei Iancu
*Director of the United States Patent and Trademark Office*